Figure 1:
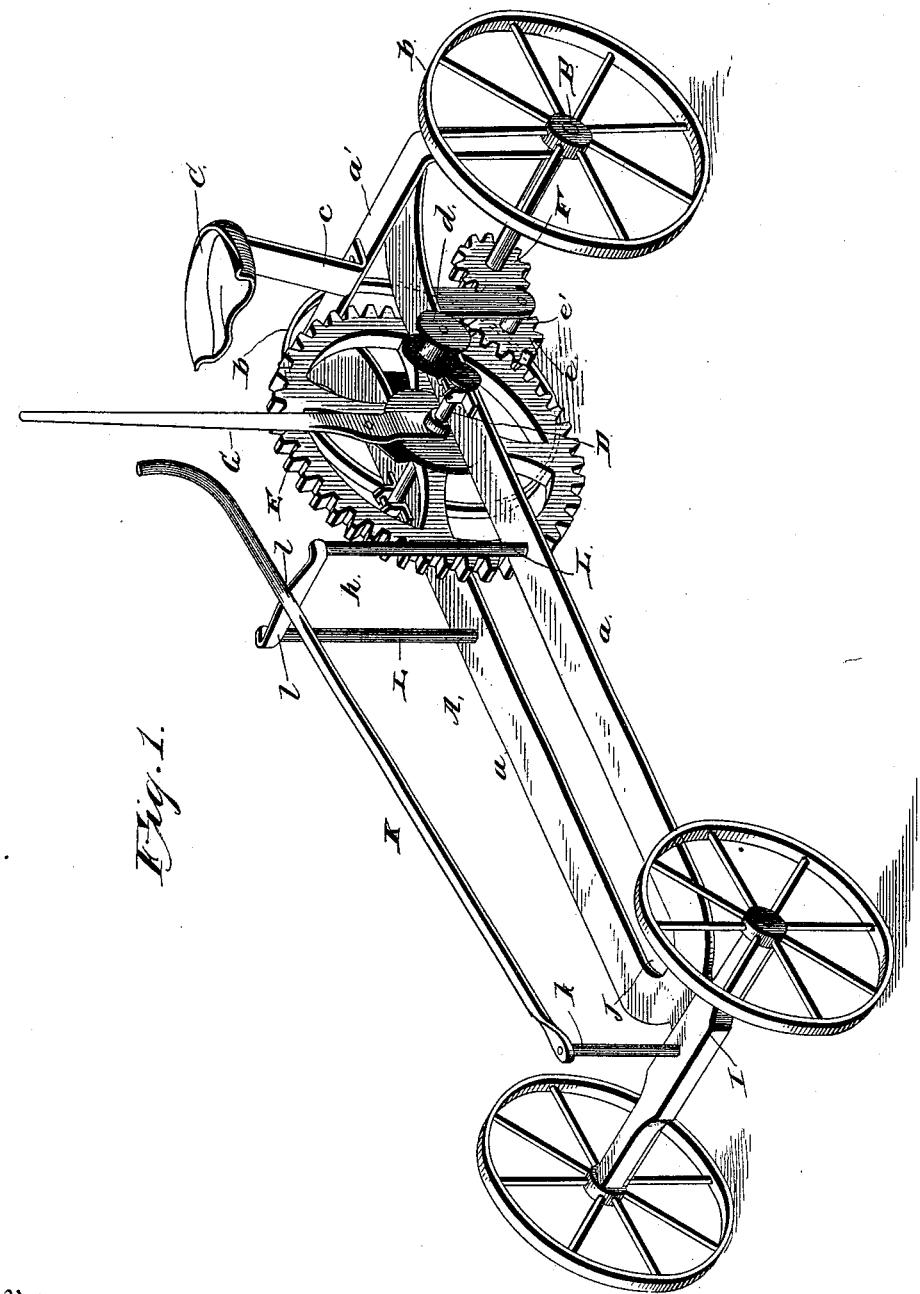

(No Model.) 2 Sheets—Sheet 1.

E. WEEKS.
VELOCIPEDE.

No. 391,100. Patented Oct. 16, 1888.

Witnesses,
Geo. J. F. Hope.
R. J. Marshall Jr.

Inventor,
Elias Weeks.
By his Attorneys
C. A. Snow & Co.

(No Model.) 2 Sheets—Sheet 2.
E. WEEKS.
VELOCIPEDE.
No. 391,100. Patented Oct. 16, 1888.
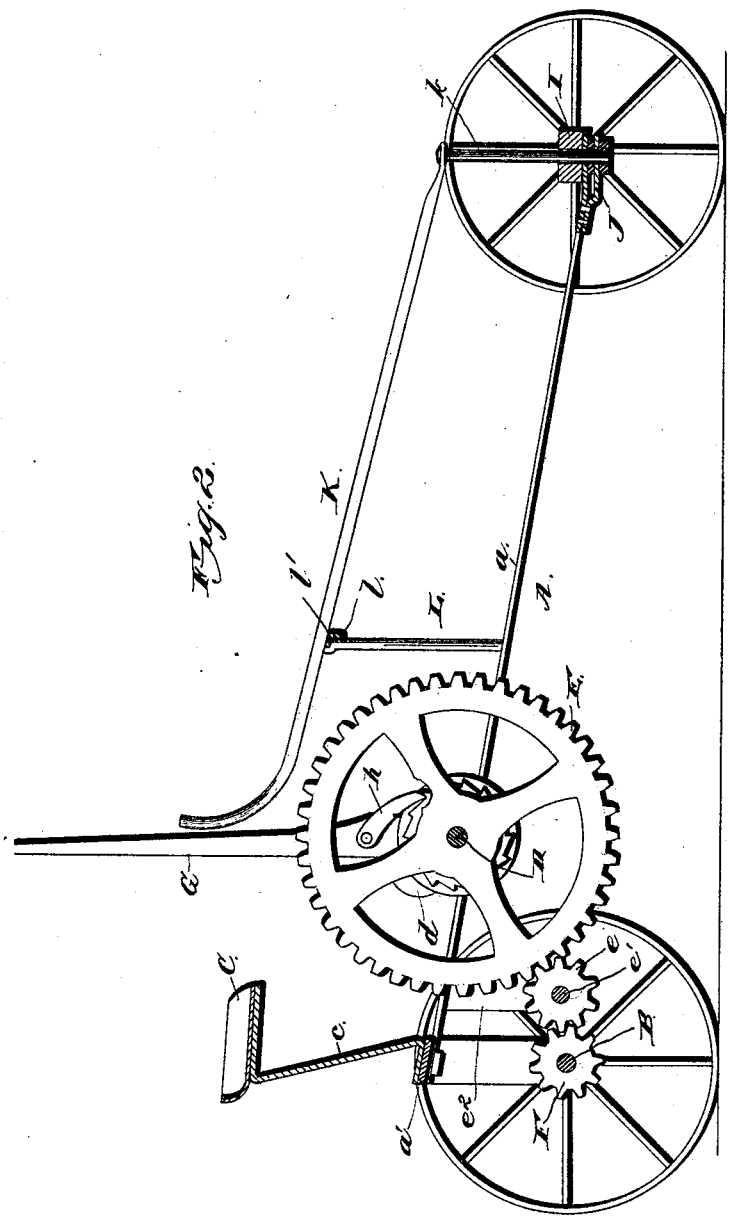
Witnesses.
Geo. J. P. Loope.
R. J. Marshall Jr.
Inventor,
Elias Weeks.
By his Attorneys
C. A. Snow & Co.

UNITED STATES PATENT OFFICE.

ELIAS WEEKS, OF WHAT CHEER, IOWA.

VELOCIPEDE.

SPECIFICATION forming part of Letters Patent No. 391,100, dated October 16, 1888.

Application filed June 8, 1888. Serial No. 276,504. (No model.)

*To all whom it may concern:*

Be it known that I, ELIAS WEEKS, a citizen of the United States, residing at What Cheer, in the county of Keokuk and State of Iowa, have invented new and useful Improvements in Vehicles, of which the following is a specification.

The invention relates to improvements in vehicles, such as velocipedes, to be operated by hand or foot power; and it consists in the construction and novel combination of parts, hereinafter described, illustrated in the drawings, and pointed out in the claim.

Figure 1 of the drawings is a perspective view of a vehicle embodying the invention. Fig. 2 is a central vertical longitudinal section thereof.

Referring to the drawings, A designates the main frame of the vehicle, composed of the side bars, *a a*, united at their front ends, and the transverse rear bar, *a'*, having depending end arms, in the ends of which the rear axle, B, having the conveyer-wheels *b* secured on its ends, is journaled.

C is the seat secured to a spring standard, *c*, rising from the rear bar, *a'*, and D is a transverse shaft journaled on the side bars, *a*, in front of the seat, and provided outside of its bearings with the treadles *d d*.

E is a large gear-wheel secured on the shaft D and meshing with a smaller gear wheel or pinion, *e*, secured on a short transverse shaft, *e'*, journaled in the ends of the arms *e²*, which depend from the rear portions of the side bar, *a*. The pinion *e* meshes with a pinion, F, of about equal size, secured on the rear axle.

G is an upwardly-standing lever-handle pivoted on the shaft D, and having pivoted upon its inner side the pawl *h*, which falls by gravity and engages the teeth of the ratchet-wheel H, secured to the side of the gear-wheel E, and having its teeth inclined rearwardly at the point where they engage the pawl, so that the latter will slip over the teeth when the lever-handle is drawn rearwardly, but when pressed forward will cause the vehicle to travel forward by means of the described gearing.

I is the front axle, having the steering-wheels *i i* on its ends and pivoted centrally upon the united front portion of the side bar, *a*, and J is a fifth-wheel of suitable construction on which said axle turns.

*k* is a rod standing centrally from the upper surface of the front axle, and K is a guiding-lever extending back longitudinally from said rod and with its rear end upturned and formed into a handle within easy reach of the rider.

L L are vertical rods standing from the side bars, *a*, and having their upper ends connected by the transverse bar *l*, provided with the central notch, *l'*, in its upper edge, in which to rest the guide-lever when not desirous of turning the vehicle.

In operation the rider can use the treadles with his feet and the lever with his hands, or he can use either alone. He thus without stopping can rest either his legs or arms. To turn the vehicle, the lever-handle is raised from the notch *l'*, and is turned to the side opposite that toward which the vehicle is to be turned.

Having described my invention, I claim—

A velocipede comprising the main frame having the side bars, *a a*, connected at their rear ends by the transverse bar *a'*, the rear axle journaled in the depending ends of the bar *a'* and having the gear-wheel F and the conveyer-wheels B B thereon, the seat mounted on the bar *a'*, the transverse shaft D, mounted on the side bars, *a a*, and carrying the treadles *d d* and the gear-wheel E, the gear-wheel *e*, connecting and meshing with the wheels E and F, the lever mounted on the shaft D and provided with a pawl engaging a ratchet on the side of the wheel E, the front axle swiveled on the front end of the frame and having the steering-wheels mounted thereon, the standard comprising the vertical rods L L, and the transverse bar *l*, connecting their upper ends, and the steering-handle connected to the front axle and engaging at its rear end in a notch in the bar *l*, substantially as specified.

In testimony that I claim the foregoing as my own I have hereto affixed my signature in presence of two witnesses.

ELIAS WEEKS.

Witnesses:
W. B. GORDON,
C. A. BARTHELMAN.